United States Patent
Bhapkar et al.

(10) Patent No.: US 8,991,287 B2
(45) Date of Patent: Mar. 31, 2015

(54) SURFACE DIMPLING ON ROTATING WORK PIECE USING ROTATION CUTTING TOOL

(75) Inventors: Rohit Arun Bhapkar, Peoria, IL (US); Eric Richard Larsen, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 287 days.

(21) Appl. No.: 13/543,167

(22) Filed: Jul. 6, 2012

(65) Prior Publication Data
US 2014/0007748 A1 Jan. 9, 2014

(51) Int. Cl.
*B23C 3/16* (2006.01)
*B23B 1/00* (2006.01)
*B23B 5/36* (2006.01)
*B23C 3/30* (2006.01)
*B23C 7/02* (2006.01)
*B23C 3/00* (2006.01)

(52) U.S. Cl.
CPC ... *B23B 1/00* (2013.01); *B23B 5/36* (2013.01); *B23C 3/30* (2013.01); *B23C 7/02* (2013.01); *Y10T 29/5114* (2015.01); *Y10T 82/10* (2015.01)
USPC ............................................. 82/1.11; 82/121

(58) Field of Classification Search
USPC ................. 82/124, 121, 1.11; 409/84; 408/71
See application file for complete search history.

(56) References Cited

U.S. PATENT DOCUMENTS

| | | | | |
|---|---|---|---|---|
| 3,525,277 A | * | 8/1970 | Jeanpretre et al. | 82/127 |
| 3,841,199 A | * | 10/1974 | Jepson et al. | 409/80 |
| 4,954,022 A | * | 9/1990 | Underwood et al. | 408/1 R |
| 5,406,043 A | * | 4/1995 | Banji | 219/69.17 |
| 5,980,232 A | * | 11/1999 | Shimosaka et al. | 425/470 |
| 6,390,740 B1 | * | 5/2002 | Nesbitt et al. | 409/132 |
| 2012/0024608 A1 | | 2/2012 | Lu | |

* cited by examiner

*Primary Examiner* — Will Fridie, Jr.
(74) *Attorney, Agent, or Firm* — Miller, Matthias & Hull LLP

(57) ABSTRACT

A combined method of machining and applying a surface texture to a work piece and a tool assembly that is capable of machining and applying a surface texture to a work piece are disclosed. The disclosed method includes machining portions of an outer or inner surface of a work piece. The method also includes rotating the work piece in front of a rotating cutting tool and engaging the outer surface of the work piece with the rotating cutting tool to cut dimples in the outer surface of the work piece. The disclosed tool assembly includes a rotating cutting tool coupled to an end of a rotational machining device, such as a lathe. The same tool assembly can be used to both machine the work piece and apply a surface texture to the work piece without unloading the work piece from the tool assembly.

18 Claims, 3 Drawing Sheets

SURFACE DIMPLING ON ROTATING WORK PIECE USING ROTATION CUTTING TOOL

This invention was made with government support under Contract No. 70NANB7H7007 awarded by Department of Energy. The government has certain rights in the invention.

TECHNICAL FIELD

This disclosure relates generally to work pieces with structured surfaces for lubrication retention. More specifically, this disclosure relates to methods for creating surface dimples on a machined work piece.

BACKGROUND

For mechanical work pieces with round cross-sections such as shafts and bores, surface texturing is important as the textured surface creates multiple small reservoirs for retaining lubricant. The surface texture typically includes dimples or indentations spaced apart in a predetermined or random fashion. Currently, for hard work pieces such as metal shafts and bores, surface texturing is done via machining or laser ablation, both of which require multiple operations on multiple machines, which is both time intensive and costly.

Machining entails removal of material from a substrate to leave a desired geometry. One example of surface texture creation by micro-machining is the use of a turning operation along with a micro-positioning system. This method allows for accurate shapes and tolerances, but is time consuming and expensive. Micro-machining may also result in an undesirable residual stress in the work piece.

Laser ablation, laser micro-milling and other laser texturing techniques have become popular because they can achieve submicron-sized features in hardened metallic surfaces with highly variable geometries. Recently, these methods have been used on a variety of automotive work pieces, mechanical seals and bearings. However, laser texturing does not allow for accurate control over the resulting dimple geometry. Further, the surface finish is generally poor if a fast process is desired, and laser texturing is both time intensive and costly as it must be performed after the work piece is machined, thereby requiring a separate process on a separate machine.

What is needed is a way to apply a texture surface to a work piece more efficiently than the currently available processes.

SUMMARY OF THE DISCLOSURE

In one aspect, a method of machining and applying dimples to a work piece is disclosed. The disclosed method may include machining portions of an outer surface of a work piece. The method may further include placing the work piece along a rotating cutting tool that is movable axially along the work piece and rotating the work piece in a first direction. The tool could also be rotated with the rotation of a turret or through a live tool holder. The method may further include engaging the outer or inner surface of the work piece with the rotating cutting device and moving the rotating cutting device axially along the work piece. The rotating cutting device may be rotating in a second direction that is same or different than the first direction. The method may further include cutting dimples on the outer or inner surface of the work piece with the rotating cutting device.

In another aspect, a tool assembly for machining a work piece and cutting dimples into an outer surface of the work piece is disclosed. The tool assembly may include a lathe that includes a chuck disposed at an end of the lathe. The chuck may have a clamped position for clamping the work piece as it is rotated and machined. The chuck may also have an open position permitting at least a portion of the work piece to pass axially through the chuck and beyond the turret of the lathe after the work piece is machined. The chuck may also be movable back to a clamped position to support the work piece beyond the end of the lathe as the work piece is rotated. The tool assembly may also include a rotating cutting tool coupled to the end of the lathe. The rotating cutting tool may include an insert for engaging the outer surface of the work piece and the rotating cutting stool may be movable axially along the work piece.

In another aspect, another method of machining and applying dimples to a work piece is disclosed. This disclosed method may include clamping the work piece in a lathe and machining the work piece in the lathe. The method may further include unclamping the machined work piece and moving the machined work piece axially at least partially beyond an end of the lathe and towards a rotating cutting tool that may be coupled to the end of the lathe. The method may further include clamping the work piece at the end of the lathe and rotating the work piece in a first direction at a first rotational velocity so that the machined work piece is engaged by the rotating cutting tool. The rotating cutting tool may be rotated in a second direction that is opposite to the first direction and at a second rotational velocity. Optionally, the rotating cutting tool and the work piece may be rotated in the same direction. Further, the method may include moving the rotating cutting tool axially along the work piece while cutting dimples in an outer surface of the work piece.

DETAILED DESCRIPTION

Figure 1:
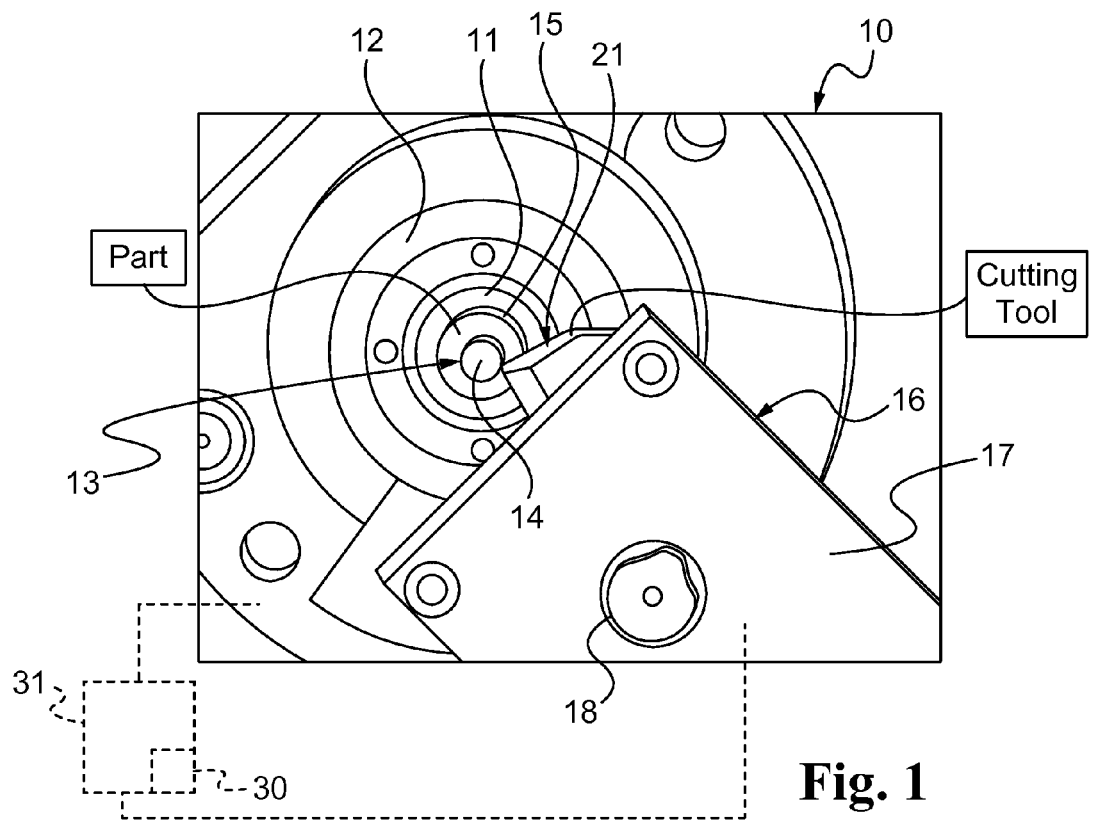
FIG. 1 is an end view of a lathe and cutting tool used for machining and applying dimples to an exterior surface of a work piece in accordance with this disclosure.

Turning to FIG. 1, this disclosure relates to a method of applying dimples to an outer surface of a work piece after the work piece has been machined. The machining process may take place in a rotating-type machine, such as a lathe 10 as shown in FIG. 1. Those skilled in the art will be familiar with lathes in general and the types of work pieces or parts that can be machined using a lathe. However, this disclosure is not limited to machining processes that include the use of a lathe. The lathe 10 shown in FIG. 1 includes a chuck 11 disposed at one end 12 of the lathe 10. The chuck 11 clamps the work piece 13 in its proper axial position while the work piece is being rotated about its axis 14 during the machining process. However, the chuck 11 may also be used to clamp the work piece 13 in front of a rotating cutting tool 16 while dimples or indentations are being formed on an outer surface 15 of the work piece 13.

To apply dimples or indentations to the outer surface 15 of the work piece 13 without removing or disengaging the work piece 13 from the lathe 10, a rotating cutting tool 16 is coupled to the end 12 of the lathe 10. The rotating cutting tool 16 includes a body 17 mounted to the end 12 of the lathe 10 via the shaft 18. The rotating cutting tool 16 may include a cutting insert 21 which engages the outer surface 15 of the work piece 13 as described below in connection with FIGS. 2-4. The rotating cutting tool 16 may be movable axially along the shaft 18.

Figure 2:
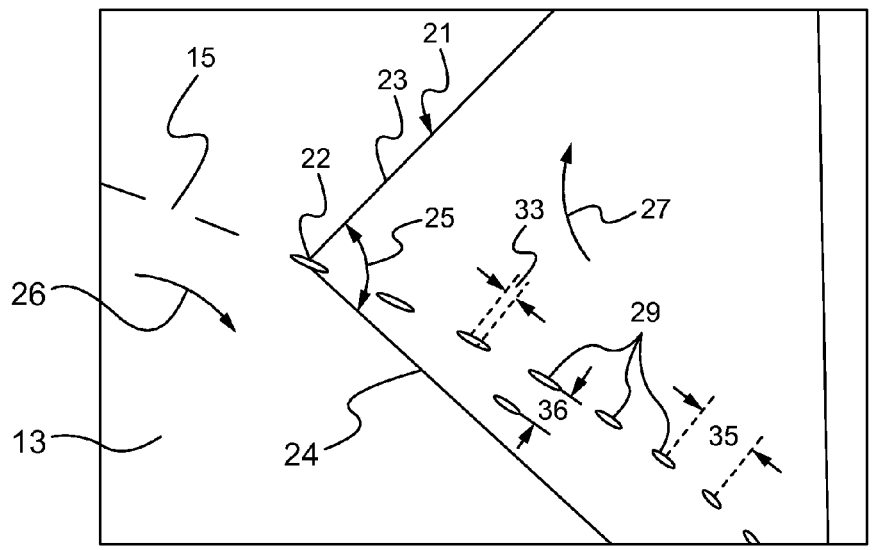
FIG. 2 schematically illustrates the engagement of the insert to the rotating cutting tool as it engages an outer surface of a work piece thereby creating dimples on the outer surface of the work piece.

Turning to FIG. 2, the outer surface 15 of the work piece 13 is shown in engagement with the cutting tool insert 21. The cutting tool insert 21 may include a nose 22 disposed between two cutting edges 23, 24. The edges 23, 24 and nose 22 define a nose angle 25. The nose angle 25 may vary greatly but, for most applications, the nose angle 25 may vary from about 5° to about 175°. For example, for parts or work pieces 13 having an overall length after machining of about 500 mm and a diameter of about 100 mm and for dimples 29 having lengths, widths or diameters of less than 1 mm and depths of less than 1 mm, the nose angle 25 or angle between the cutting edges may range from about 85° to about 95°. In one non-limiting example provided below, the nose angle is about 88° but, as also shown below, this value is dependent on a variety of parameters. Also illustrated in FIG. 2 is the counter-rotating of the work piece 13 and the rotating cutting tool 16 or the insert 21 of the rotating cutting tool 16 as indicated by the arrows 26, 27.

Figure 3:
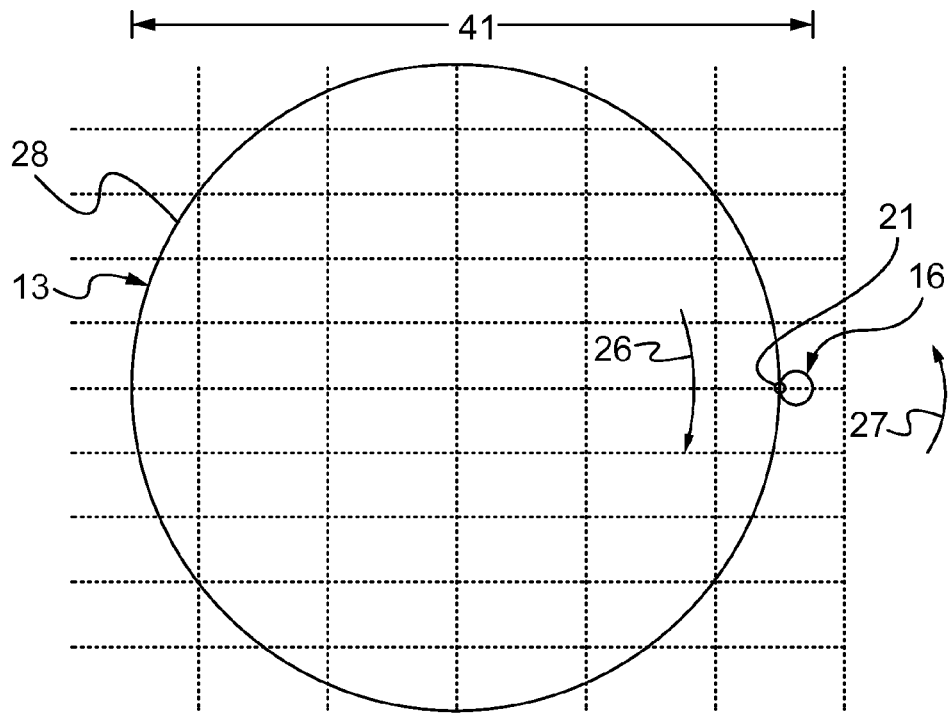
FIG. 3 is a schematic end view of a rotating work piece and rotating cutting tool engaging the outer surface of the work piece to impose dimples thereon.
Figure 4:
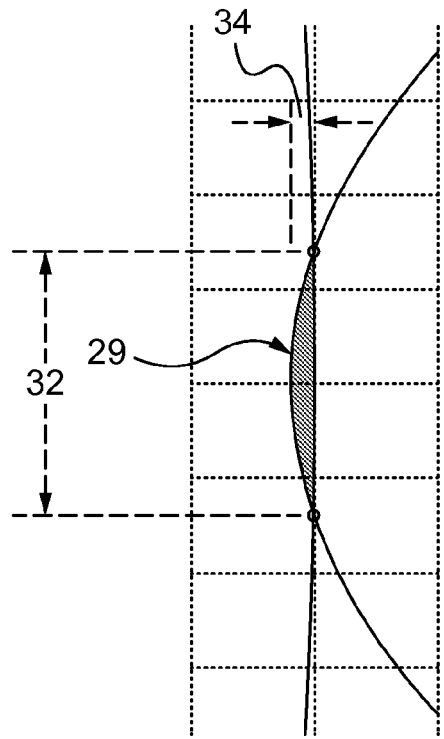
FIG. 4 is a schematic illustration of the cutting tool path into the outer surface of the work piece to create a dimple thereon.

FIG. 3 also illustrates this counter-rotation. Specifically, the work piece 13 may rotate in a clockwise direction as indicated by the arrow 26 and the rotating cutting tool 16 may rotate in a counterclockwise direction as indicated by the arrow 27. Of course, these rotational directions may be reversed with the work piece 13 rotating in a counterclockwise direction and the cutting tool 16 rotating in a clockwise direction. The work piece 13 and the rotating cutting tool 16 may also rotate in the same direction. The cutting tool insert 21 is shown not only engaging the outer surface 28 of the work piece 13 but also cutting into the outer surface 28 of the work piece 13 to form the dimples 29 shown in FIGS. 2 and 4. To control the diameter or length 32 (FIG. 4) and width 33 (FIG. 2) of the dimples 29, the depth 34 of the dimples 29, the circumferential spacing 35 of the dimples 29 and the axial spacing 36 of the dimples 29 along the outer surface 28 of the work piece 13, the use of an algorithm or software may be used that may be stored in the memory 30 of a controller 31. The controller 31 may be linked to both the rotating cutting tool 16 and the lathe 10 as indicated schematically in FIG. 1. It is anticipated that only a single controller 33 would be required for both the lathe 10 and the rotating cutting tool 16.

Returning to FIGS. 2-4, the input parameters may include the desired length 32 and width 33 of the dimples 29 or the diameter of the dimples 29, if the dimples 29 are generally circular. The desired depth 34 (FIG. 4), the desired circumferential spacing 35 (FIG. 2), and the desired axial spacing 36 (FIG. 2) may also be inputted to the controller 31.

Further, to generate the appropriate operating parameters, the software or controller 31 may require the length (not shown) of the work piece 13 and the diameter 41 of the work piece 13 (FIG. 3). Finally, another possible input is the axial feed rate of the rotating cutting tool 16. Specifically, the work piece 13 will have been machined in the lathe 10 and will have been extended out through the end 12 of the lathe 10 thereby exposing the outer surface 28 of the work piece 13 that requires dimple application. The rotating cutting tool 16 may be designed so that it can move axially along the exposed outer surface 28 of the work piece 13. The lathe 10 and rotating cutting tool 16 work together to counter-rotate the work piece 13 and the cutting tool insert 21 with respect to each other as the rotating cutting tool 16 moves axially with respect to the work piece 13. The speed at which the cutting tool insert 21 proceeds axially along the outer surface 28 of the work piece 13 will hereinafter be referred to as the axial feed rate and a desired axial feed rate may also be inputted to the controller 31 as an input parameter.

The software or algorithm of the controller 31 may also generate output parameters. For example, the software or algorithm may determine the appropriate rotational velocity of the cutting tool 16, the rotational velocity of the work piece 13 and the appropriate position of the cutting tool 16 with respect to the work piece 13 so that the depth 34 of the cut or the dimple 29 is accurate. The software or algorithm may also calculate an appropriate nose angle 25 and therefore determine which cutting tool insert 21 should be used for a particular work piece 13. Another possible output variable is the cutting edge length which is the sum of the lengths of the edges 23, 24 of the cutting tool insert 21 as shown in FIG. 2.

A non-limiting example is provided below for purposes of illustrating possible input parameters and possible output parameters generated by the software.

TABLE 1

| Input Parameters | | Output Parameters | |
|---|---|---|---|
| Dimple Dimensions | | Cutting Tool RPM | 478 |
| Length (mm) | 0.2 | Work Piece RPM | 8 |
| Width (mm) | 0.18 | Depth of cut (mm) | 0.004 |
| Depth (mm) | 0.004 | Axial spacing between cutting tool and work piece (mm) | 52.564 |
| Circumferential Spacing (mm) | 0.64 | Effective cutting tool radius (mm) | 2.568 |
| Axial spacing (mm) | 0.64 | | |
| Work piece Dimensions | | Cutting edge (mm) | 4 |
| Length (mm) | 500 | Nose Angle (deg) | 88 |
| Diameter (mm) | 100 | | |
| Axial Reed Rate | | | |
| Axial Feed Rate m/mm | 150 | | |

The reader will note that the above parameters are applied to a work piece having a length of 500 mm and a diameter of 100 mm and specific dimple 29 dimensions. All of the above values may vary greatly, depending upon the dimensions of the work piece 13, the material from which the work piece 13 is fabricated, the material from which the cutting tool insert 21 is fabricated, etc.

Figure 5:
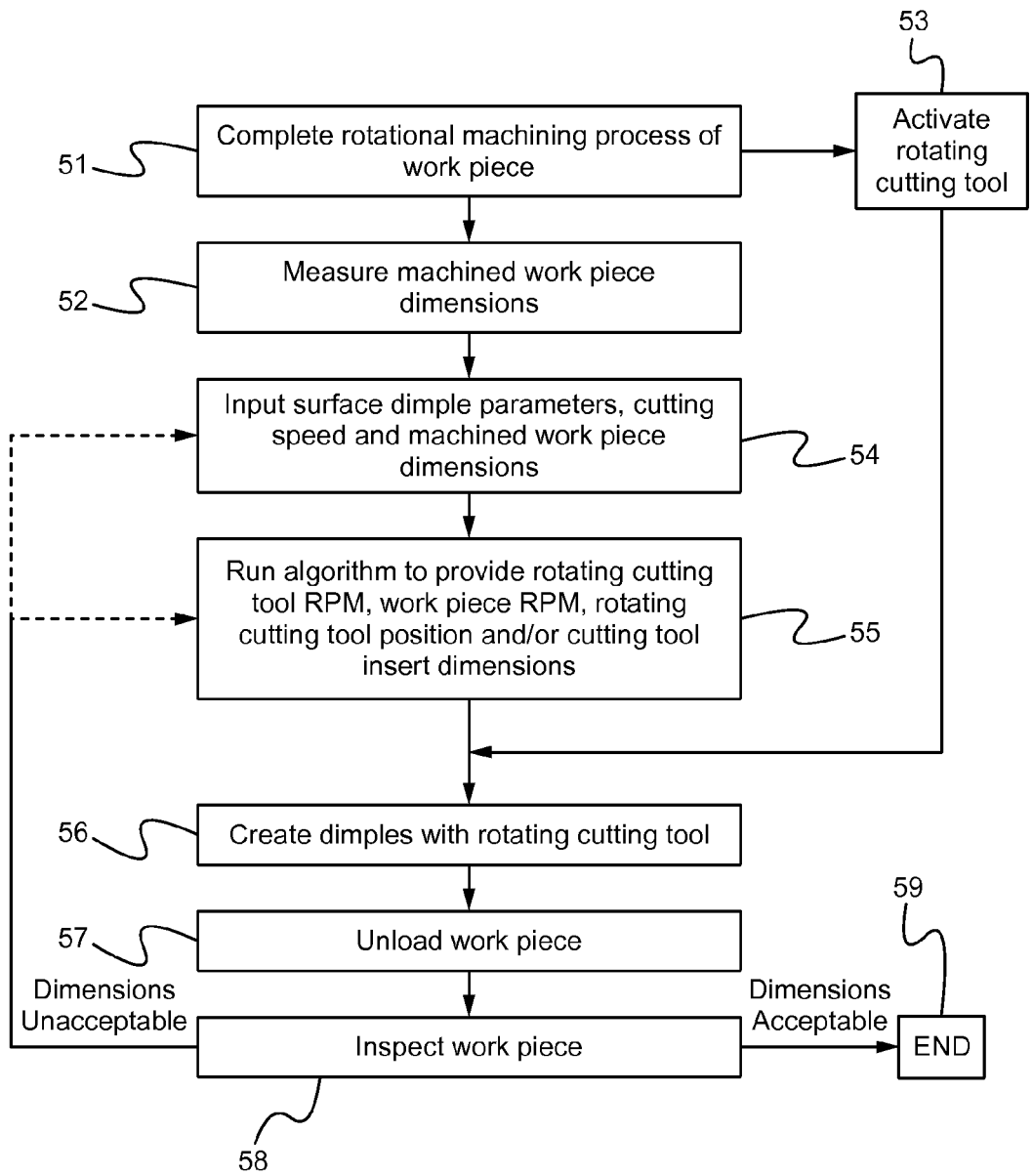
FIG. 5 is a flow diagram illustrating the methods of machining work pieces and applying dimples to the outer surfaces of machined work pieces in accordance with this disclosure.

Finally, FIG. 5 illustrates, schematically, various disclosed methods for machining a work piece 13 and applying dimples 29 to the outer surface 28 of the work piece 13. At step 51, the rotational machining process is completed. Again, this may be performed on a lathe 10 or other rotational machining device. A modern lathe 10 designed to fabricate metal parts will come with controls and sensors to measure the dimensions of the machined work piece 13 at step 52. Further, before or after step 52, the rotating cutting tool is activated at step 53. At step 54, the required input variables are entered via an interface to the controller 31 or by some other suitable means. The input variables may include the surface dimple dimensions or parameters, the axial feed rate and the dimensions of the machined work piece as indicated above in Table 1.

The algorithm or software stored in the memory 30 of the controller 31 is then run at step 55 which calculates the proper rotational velocities of the rotating cutting tool 16, the rotational velocity of the work piece 13, the axial position of the rotating cutting tool 16 with respect to the work piece 13 and/or the dimensions of the cutting tool insert 21. With the lathe 10 rotating the work piece 13 and with the rotating cutting tool 16 rotating the cutting tool insert 21 in a counter-direction to the work piece 13, the dimples are created at step 56 as the rotating cutting tool 16 moves axially along the work piece 13 at a selected axial feed rate. The work piece is unloaded at step 57 and inspected at step 58. If the dimensions are unacceptable, the algorithm may be run again at step 55 or the input variables may be checked and/or reentered at step 54 so that steps 55-57 can be repeated and the work piece 13 re-inspected at step 58. If the dimensions of the dimples 29 are acceptable, the process ends at step 59.

INDUSTRIAL APPLICABILITY

An improved method of applying dimples to the outer surface of a machine part or work piece is disclosed. The disclosed process provides a structured surface texture for work pieces or parts such as shafts or bores that require lubrication retention. The surface texture or the dimples created by the disclosed methods serve as reservoirs for lubricant. Typically, such surface texturing must be performed in multiple operations using multiple machines, thereby making such service texturing expensive. However, the disclosed methods and machine may both create a machined part and dimple the machined part without removing the part from the machine on which the machining process is performed. Thus, the disclosed methods and machine provide faster and more efficient ways of applying a surface texture to a machined work piece.

First, the rotational machining of the work piece is completed, typically using a lathe or other similar machine. The lathe or other machine is equipped with a rotating cutting tool coupled to one end (which may be a turret or a live tool holder) of the lathe. The end of the lathe may be equipped with a chuck that enables the machined part to be slid through the chuck and outward beyond the end of the lathe so that the machined part or work piece can be accessed by the rotating cutting tool. The lathe may provide an accurate measurement of the length and diameter of the machined work piece. Otherwise, these measurements may be attained and inputted to the controller along with the desired surface dimple parameters, the desired axial feed rate and the machined work piece dimensions. The controller is equipped with software that includes an algorithm that provides the requisite cutting tool rotational velocity, the work piece rotational velocity, the position of the rotating cutting tool and/or the dimensions of the cutting tool insert. The controller will then operate the cutting tool and lathe to create dimples of the desired dimensions. After unloading the work piece for the first time since the machining began, the dimples are inspected and if they fail inspection, modification of the input parameters may be considered or the machined work piece may be run through the dimpling process again.

An improved tool assembly for machining a work piece and applying a surface texture to the work piece without unloading the work piece from the tool assembly is also disclosed. The tool assembly includes a rotational machining tool, such as a lathe, that has a chuck or work piece holder at one end thereof. The chuck or holder may be loosened to pass the work piece at least partially through and beyond the end of the lathe so that the portion of the work piece that needs a surface texture is disposed in front of a rotational cutting tool coupled to the end of the lathe. The rotating tool or the rotating cutting tool is able to move axially along the work piece as the cutting tool insert repeatedly engages the outer surface of the work piece and applies a series of dimples to the outer surface. The dimples form a surface texture which is excellent for retaining lubricant that will extend the life of the work piece.

What is claimed is:

1. A method of machining and applying dimples to a work piece, the method comprising:
    moving a machined work piece towards a rotating cutting device and rotating the work piece in a first direction so that the machined work piece moves along and is engaged by the rotating cutting device, the rotating cutting device rotating in a second direction; and
    cutting dimples in an outer surface of the machined work piece with the rotating cutting device,
    wherein the rotating cutting tool includes an insert that engages the work piece, the insert including a nose disposed between two cutting edges, the two cutting edges being disposed at a nose angle with respect to each other that ranges from about 5° to about 175°.

2. The method of claim 1 further including machining the work piece before moving the work piece towards the rotating cutting device.

3. The method of claim 1 wherein the machining of the work piece occurs in a first machine and the rotating cutting device is coupled to the first machine.

4. The method of claim 3 wherein the first machine is a lathe.

5. The method of claim 1 wherein the rotating of the work piece is at a first rotational velocity and the cutting tool rotates at a second rotational velocity, the first rotational velocity being less than the second rotational velocity.

6. The method of claim 1 wherein the work piece rotates about a first axis and the cutting tool rotates about a second axis, the second axis being at least substantially parallel to the first axis.

7. The method of claim 1 the first direction and the second direction are at least substantially opposite.

8. The method of claim 1 wherein the first direction and the second direction are at least substantially the same.

9. The method of claim 1 wherein the nose angle ranges from about 85° to about 90°.

10. A tool assembly for machining a work piece and cutting dimples into an outer surface of the work piece, the tool assembly comprising:
    a lathe including a chuck disposed at an end of the lathe, the chuck having a clamped position for clamping the work piece as it is rotated and machined, the chuck having an open position permitting at least a portion of the work piece to pass through the chuck and beyond the end of the lathe after the work piece is machined, the chuck being movable back to the clamped position to support the portion of the machined work piece beyond the end of the lathe as the work piece is rotated;
    a rotating cutting tool slidably coupled to the end of the lathe, the rotating cutting tool including an insert for engaging the outer surface of the machined work piece,
    wherein the rotating cutting tool includes an insert that engages the work piece, the insert including a nose disposed between two cutting edges, the two cutting edges being disposed at a nose angle with respect to each other that ranges from about 5° to about 175°.

11. The tool assembly of claim 10 wherein the lathe rotates the work piece at a first rotational velocity and the rotating cutting tool rotates at a second rotational velocity, the first rotational velocity being less than the second rotational velocity.

12. The tool assembly of claim 10 wherein the work piece rotates about a first axis and the cutting tool rotates about a second axis, the second axis being at least substantially parallel to the first axis.

13. The tool assembly of claim 10 wherein the lathe rotates the work piece in a first direction and the rotating cutting tool rotates in a second direction that is at least substantially opposite to or at least substantially the same as the first direction.

14. The tool assembly of claim 10 wherein the nose angle ranges from about 85° to about 95°.

15. A method of machining and applying dimples to a work piece, the method comprising:
   clamping the work piece in a lathe;
   machining the work piece in the lathe;
   clamping the work piece at the end of the lathe and rotating the work piece in a first direction at a first rotational velocity so that the machined work piece is engaged by the rotating cutting device, the rotating cutting device rotating in a second direction at a second rotational velocity; and
   cutting dimples in an outer surface of the work piece with the rotating cutting device,
   wherein the rotating cutting tool includes an insert that engages the work piece, the insert including a nose disposed between two cutting edges, the two cutting edges being disposed at a nose angle with respect to each other that ranges from about 5° to about 175°.

16. The method of claim 15 further including controlling a circumferential spacing between the dimples by controlling the first and second rotational velocities.

17. The method of claim 15 wherein the rotating cutting tool is movable axially along the work piece at a axial feed rate and the method further includes
   controlling an axial spacing between dimples by controlling the axial feed rate.

18. The method of claim 15 wherein the nose angle ranges from about 85° to about 95.

* * * * *